United States Patent
Hahn et al.

(10) Patent No.: US 11,157,439 B2
(45) Date of Patent: Oct. 26, 2021

(54) METHOD FOR DELAYING FUNDAMENTAL RESET IN POWER LOSS PROTECTION (PLP) ENABLED DEVICES

(71) Applicant: Western Digital Technologies, Inc., San Jose, CA (US)

(72) Inventors: Judah Gamliel Hahn, Ofra (IL); Karin Inbar, Ramat Hasharon (IL); Horst-christoph Georg Hellwig, Innsbruck (AT)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 230 days.

(21) Appl. No.: 16/522,492

(22) Filed: Jul. 25, 2019

(65) Prior Publication Data

US 2021/0026800 A1   Jan. 28, 2021

(51) Int. Cl.
*G06F 15/177* (2006.01)
*G06F 11/14* (2006.01)
(Continued)

(52) U.S. Cl.
CPC .......... *G06F 15/177* (2013.01); *G06F 3/0619* (2013.01); *G06F 3/0656* (2013.01);
(Continued)

(58) Field of Classification Search
CPC ............. G06F 11/1441; G06F 11/3034; G06F 15/177; G06F 3/0619; G06F 3/0632; G06F 3/0656; G06F 3/0673; G06F 3/0679
See application file for complete search history.

(56) References Cited

U.S. PATENT DOCUMENTS

| 9,122,636 B2 | 9/2015 | Lucas et al. |
| 9,563,557 B2 | 2/2017 | Kumar et al. |

(Continued)

FOREIGN PATENT DOCUMENTS

| KR | 10-2012-0093869 A | 8/2012 |
| WO | 2018143970 A1 | 8/2018 |

OTHER PUBLICATIONS

International Search Report and Written Opinion issued in corresponding Internation Patent Application No. PCT/US2020/023432, dated Jul. 9, 2020 (9 pages).

*Primary Examiner* — Terrell S Johnson
(74) *Attorney, Agent, or Firm* — Patterson & Sheridan LLP; Steven H. Versteeg

(57) ABSTRACT

Apparatus and methods for protecting in-flight data during a fundamental reset of a SSD by a connected host are presented. In embodiments, a controller for the SSD includes an input interface configured to receive commands from the host over a link, and processing circuitry coupled to the input interface. The processing circuitry is configured to, in response to receiving a reset command from the host, reset the link and an address space of the SSD, complete a flush of in-flight data from temporary buffers to non-volatile storage of the SSD, and, during an initialization sequence performed by the host, perform an internal reset. In embodiments, in response to the SSD performing the internal reset, the host's state of the SSD is reset, and the host is caused to re-initialize the link and configure the address space of the SSD.

20 Claims, 3 Drawing Sheets

(51) Int. Cl.
 *G06F 3/06* (2006.01)
 *G06F 11/30* (2006.01)
(52) U.S. Cl.
 CPC ........ *G06F 3/0673* (2013.01); *G06F 11/1441* (2013.01); *G06F 11/3034* (2013.01)

(56) References Cited

U.S. PATENT DOCUMENTS

| | | |
|---|---|---|
| 9,990,023 B2 | 6/2018 | Paley et al. |
| 2010/0306448 A1* | 12/2010 | Chen .................. G06F 12/0804 711/103 |
| 2011/0058440 A1 | 3/2011 | Smith et al. |
| 2012/0278653 A1 | 11/2012 | Cheng et al. |
| 2016/0070474 A1 | 3/2016 | Yu et al. |
| 2016/0350015 A1 | 12/2016 | Luo et al. |
| 2017/0315873 A1 | 11/2017 | Alcorn et al. |
| 2017/0315889 A1 | 11/2017 | Delaney et al. |
| 2018/0032390 A1* | 2/2018 | Rahmanian ............... G06F 1/30 |
| 2019/0163378 A1 | 5/2019 | Carlough et al. |

* cited by examiner

METHOD FOR DELAYING FUNDAMENTAL RESET IN POWER LOSS PROTECTION (PLP) ENABLED DEVICES

BACKGROUND OF THE DISCLOSURE

Field of the Disclosure

Embodiments of the present disclosure generally relate to apparatus and methods for delaying a fundamental reset command received from a host in PLP-enabled devices.

Description of the Related Art

Solid state devices (SSDs) are broadly categorized into enterprise-grade and consumer-grade devices, which have different feature sets respectively, each appealing to a specific market and bearing a corresponding cost. Typically, enterprise-grade devices feature PLP, where all data written to the device is guaranteed to be present even after a sudden power loss or an unexpected device reset. However, consumer-grade devices generally only guarantee data after these events if the data was already flushed (e.g., from temporary buffers) to non-volatile media. Accordingly, in a consumer-grade device, data which was in-flight and was only stored in temporary buffers within the device's controller, or in associated volatile memory, may be lost.

Recent changes in the enterprise device market have created a new category of devices—entry-level enterprise SSDs. While these devices do not require many of the features of an enterprise-grade device (e.g., guaranteed latency), they still require PLP support. Moreover, this new device category is typically based on a consumer-grade SSD with the addition of some additional on-board capacitors to provide power during power-loss events to completely flush temporary buffers within the controller.

Nonetheless, even with such power-loss capacitor backup, because a consumer-grade device is not required to guarantee data during a sudden power loss or reset, its device controller may discard the contents of internal buffers ("in-flight data") during a reset operation. However, to properly reset a device that supports PLP, all in-flight data must be flushed to non-volatile memory.

Because the new entry-level enterprise SSDs are based on consumer-grade devices which do not guarantee such flushing, a solution is needed to protect in-flight data in entry-level enterprise SSDs during a fundamental reset, and thus fully support PLP.

SUMMARY OF THE DISCLOSURE

The present disclosure generally describes apparatus and methods for protecting in-flight data during a fundamental reset of a SSD by a connected host. In one embodiment, a controller for the SSD includes an input interface configured to receive commands from the host over a link, and processing circuitry coupled to the input interface. The processing circuitry is configured to, in response to receiving a reset command from the host, reset the link and an address space of the SSD, complete a flush of in-flight data from temporary buffers to non-volatile storage of the SSD, and, during an initialization sequence performed by the host, perform an internal reset. In one embodiment, the processing circuitry is further configured to begin to flush the in-flight data to the non-volatile storage prior to resetting the link and the address space of the SSD. In one embodiment, in response to the SSD performing the internal reset, the host's state of the SSD is reset, and the host is caused to re-initialize the link and configure the address space of the SSD.

In another embodiment, a data storage device (DSD) includes a non-volatile memory and a controller. The controller is configured to provide a false reset indication to a host device in response to a reset command, flush in-flight data to the non-volatile memory, and provide a second reset indication to the host device.

In another embodiment, an apparatus includes means for receiving a reset command from a host over a link, means for emulating a conventional reset of the apparatus as seen by the host in response to the command, and temporary storage means and non-volatile storage means. The apparatus further includes means for flushing in-flight data from the temporary storage means to the nonvolatile storage means, and means for performing an actual reset prior to the host completing an initialization sequence of the apparatus.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
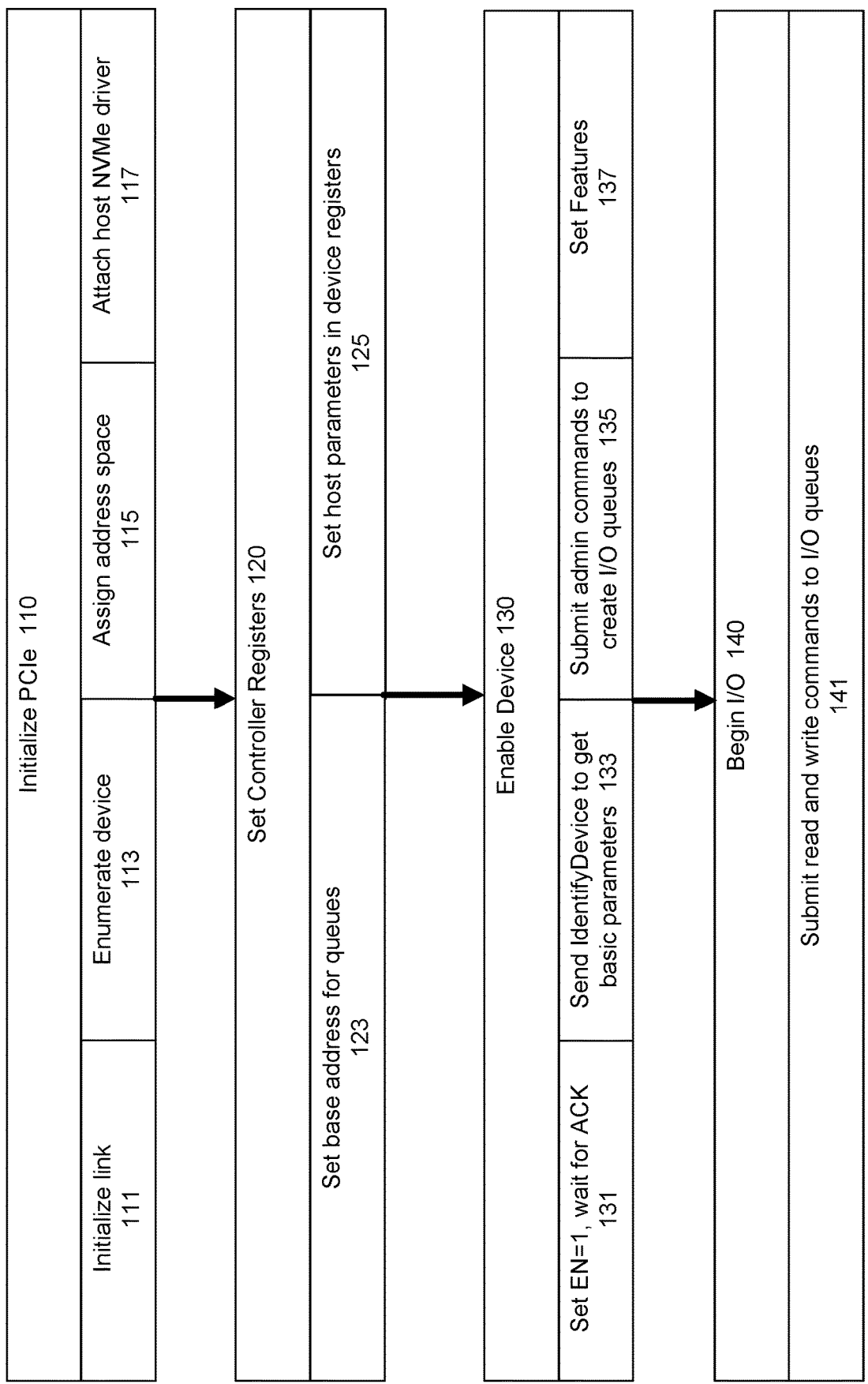
FIG. 1 illustrates an example startup sequence of a non-volatile memory device connected over a Peripheral Component Interconnect Express (PCIe) link, from a host's perspective.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

In the following disclosure, apparatus and methods for protecting in-flight data during a fundamental reset of a SSD by a connected host are described. In embodiments, a controller for the SSD includes an input interface configured to receive commands from the host over a link, and processing circuitry coupled to the input interface. The processing circuitry is configured to, in response to receiving a reset command from the host, reset the link and an address space of the SSD, complete a flush of in-flight data from temporary buffers to non-volatile storage of the SSD, and, during an initialization sequence performed by the host, perform an internal reset. In embodiments, in response to the SSD performing the internal reset, the host's state of the SSD is reset, and the host is caused to re-initialize the link and configure the address space of the SSD.

In one or more embodiments, methods and apparatus may be provided to protect in-flight data during a PCIe fundamental reset of a SSD, when power is not lost but the PCIe link is unilaterally reset by the host. In one or more embodiments, the methods may be implemented on a consumer-grade storage device controller architecture to provide full PLP functionality on the controller, and thus for the storage device as a whole.

Generally, in consumer-grade controller architectures, PCIe fundamental reset handling is performed in hardware. This protects against firmware deadlocks by guaranteeing that that a conventional reset will always result in a newly initialized controller. In a device supporting PLP, in order to insure that no data is lost, all in-flight data must be flushed to non-volatile media following an unexpected device reset. However, the strict timing constraints of a PCIe fundamental reset do not provide sufficient time to accomplish the requisite PLP data flush before a device controller is required to complete the reset. Thus, more time is needed.

In embodiments, to obtain such needed additional time, once a host initiates a fundamental reset, an example device resets only the PCIe link and address space, creating the illusion of a reset as seen from the host's point of view. While in this state, the device continues to flush existing data to non-volatile memory (NVM). As the host proceeds through the initialization sequence, the device provides a second, this time actual, reset indication to the host, which causes the host to automatically return to the beginning of the initialization sequence. Thus, in embodiments, by sending two reset indications, a first false one, and a second actual one, sufficient time is obtained to complete the flushing of all in-flight data to NVM.

FIG. 1 illustrates a startup sequence of an example NVMe device connected to a host over a PCIe link, from the host's perspective. An NVMe device is one that utilizes the NVMe communications standard, which was developed specially for SSDs. It operates across a PCIe link or bus (hence the "e" for 'express' in its name), which allows the SSDs to operate more like fast memory, rather than conventional hard disks. For example, one NVMe based SSD is the WD Black™ PC SN750 NVMe™ SSD, provided by Western Digital.

The host behavior illustrated in FIG. 1 is accurate for Linux and Windows operating systems running on Intel™ hosts with PCIe-compliant root complexes and switches. However, it is noted that some alternative embedded low-cost environments may have slightly different behavior than that shown in FIG. 1, and may, as a result, lie outside the scope of the present disclosure.

With reference to FIG. 1, there are four high level tasks performed by an example host at startup of an example PCIe compliant device. Within each high level task, one or more sub-tasks are included. These are next described.

Continuing with reference to FIG. 1, the four high level tasks include initialize PCIe 110, set controller registers 120, enable device 130 and begin input/output (I/O) 140. Referring to the initialize PCIe task 110, this is where the host initializes the PCIe link over which it is connected to the SSD. In the depicted example, the following sub-tasks of initialize PCIe task 110 are included: initialize link 111, enumerate device 113, assign address space 115, and attach a host NVMe driver 117.]

Continuing further with reference to FIG. 1, following the initialize PCIe task 110, the second task is to set control registers 120. This task includes setting a base address for queues 123, and setting host parameters in device registers 125. Following the set control registers task 120, the third PCIe startup task performed by the host is to enable the device 130. This task includes four sub-tasks, namely, a first sub-task 131 to set the value of an enable register on the device equal to 1, or EN=1, and wait for an acknowledgement by the device. In embodiments, this is a key feature of the link initialization protocol, as next described.

In the NVMe protocol, the enable register set by the host at sub-task 131 is known as "CC.EN NVMe register." Once the host sets this register equal to 1, the device is then required to respond by setting another register, "CSTS.RDY" to the value 1, thereby indicating that the device is ready to accept commands from the host. Thus, following setting EN=1, the host polls the CSTS.RDY register waiting to see its value set to 1. This is indicated in FIG. 1 by the "wait for ACK" portion of sub-task 131. There is a predefined polling interval for this acknowledgement. If, at the end of a first polling interval the value of CSTS.RDY register is not seen as 1 by the host, then the host may repeat the polling interval several additional times, until either the register is set to 1 by the device, or a timeout period has elapsed. As explained in detail below with reference to blocks 325 and 335 of FIG. 3, if at this point, e.g., during the polling interval(s), the device resets the link on its side, then the host's PCIe state of the device is destroyed, and the host must re-enumerate the device. Because the initialization sequence shown in FIG. 1 is performed by the host after every fundamental reset it commands, in embodiments, this polling period in which the host waits to see the ACK of sub-task 131 may be used to complete the flushing of all in-flight data to non-volatile storage, thus providing the desired full PLP functionality, after which the device may initiate a link reset to trigger a normal initialization of the device.

Continuing with reference to FIG. 1, following first sub-task 131, the host sends an identify device command to obtain basic parameters 133, submits administrative commands to create I/O queues 135, and sets features 137. This completes the enable device task 130.

Finally, following the enable device task 130, the host performs a fourth and final high level task, begin I/O 140. This fourth task includes one sub-task, namely, to submit read and write commands to the I/O queues 141 (created at sub-task 135) on the device.

As noted above, in embodiments, when a host sends a fundamental reset command to a device, it first rests the link to the device, and then performs the initialization sequence of FIG. 1. As noted, in embodiments, the key aspect of the initialization sequence is the set EN=1 and wait for ACK subtask 131, of task enable device 130. This is because, in embodiments, upon receiving the fundamental reset command from the host, the device may initially emulate an actual reset, but not actually perform it. The host, seeing the emulation, goes on to perform the initialization sequence of FIG. 1, including sub-task 131. In embodiments, the example device may extend the host's waiting period of sub-task 131 in order to complete flushing of all in-flight data to the device's nonvolatile storage. Then, when the flushing of the in-flight data has completed, as long as the host's polling interval(s) for seeing the acknowledgement have not timed out, in embodiments, the device may initiate its own link reset, which causes the host to reinitialize the device and re-run the sequence shown in FIG. 1.

In embodiments, in a PCIe fundamental reset, the PCIe link is reset by the host using the PERST# sideband signal. This is described, for example, in PCI Express SFF-8639 specification, version 3.0, sections 2.2.2 and 2.9.2, and need not be repeated here. In general, each device type may set its own timing constraints. For example, in some devices $T_{PERST}$ is defined as 100 µs. Thus, in such devices the device must be ready to initialize the link and begin operations vis-à-vis the host 100 µs after the PERST# signal is asserted as part of a reset.

As described above, the design of consumer-grade controllers may couple the PERST# signal assertion with internal hard reset functionality, because consumer-grade devices do not require data loss protection as part of a reset, and an internal hard reset ensures that the device will recover from any internal controller or firmware timeouts.

Figure 2:
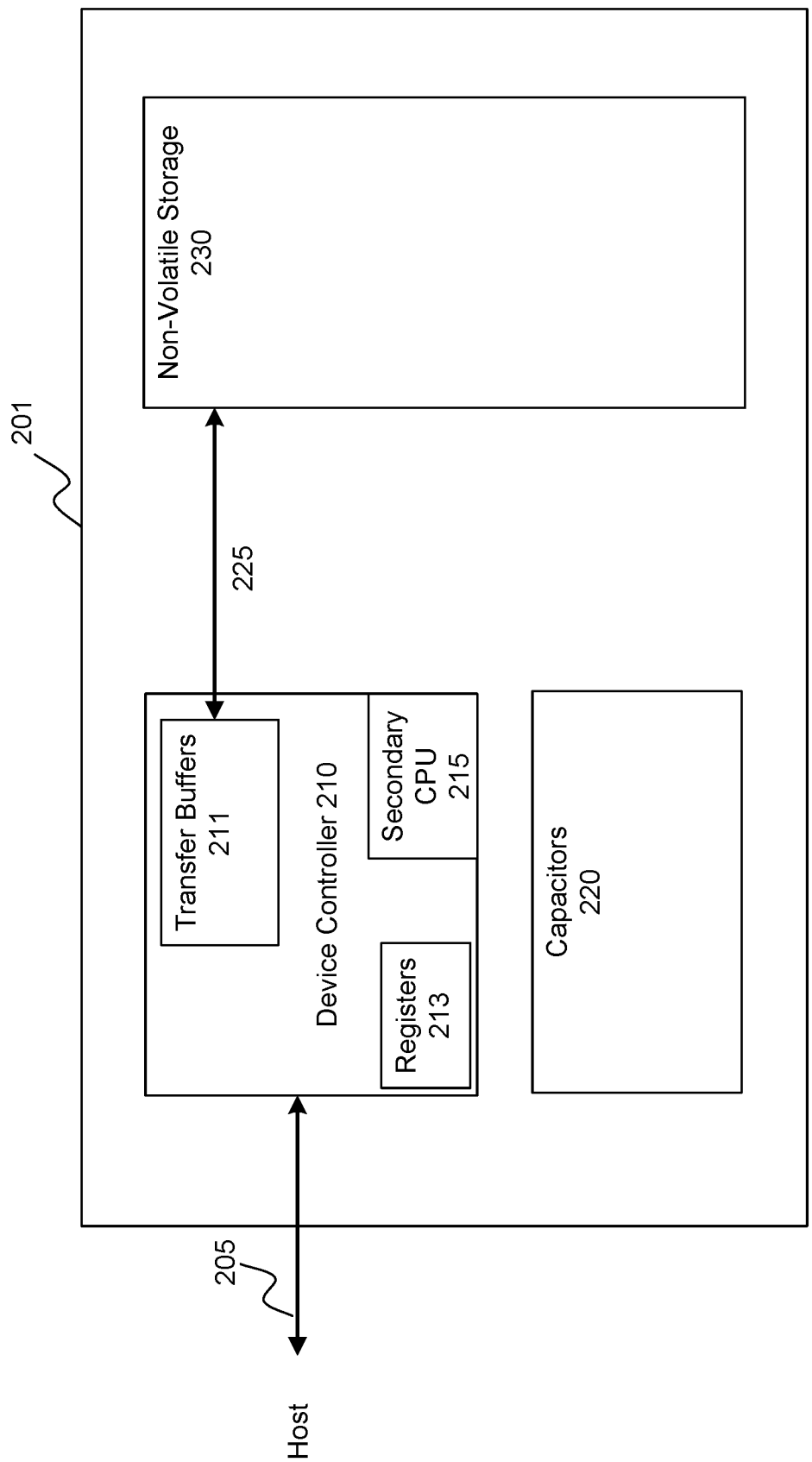
FIG. 2 illustrates an example non-volatile memory device controller provided in a SSD, in accordance with various embodiments.

For example, some entry-level enterprise products may use a consumer-grade controller, with additional firmware running on a separate CPU core that handles, among other things, sudden power loss scenarios. In embodiments, a sudden power loss is indicated by a drop of the voltage of a power rail of the SSD, and power to write in-flight transfer buffers being then supplied by capacitors. In embodiments, not only is that scenario supported, but PLP is also provided when the link is reset by a host, to insure that following such a reset, no data is lost. FIG. 2, next described, illustrates an example consumer-grade memory device controller provided in a SSD, in accordance with various embodiments.

With reference to FIG. 2, there is shown SSD 201. In embodiments, SSD 201 may be an NVMe device. SSD 201 includes device controller 210 and non-volatile storage 230. SSD 201 also includes capacitors 220, which are used, in embodiments, to power SSD 201 during a power loss situation. Device controller 210 is connected to a host over link 205, which, for purposes of illustration, is a simplified link that may include multiple channels to exchange data and commands between the host (not shown) and device controller 210. In embodiments, link 205 may be a PCIe link. Device controller 210 also includes transfer buffers 211, which may hold data received from a host for storage in the SSD, but that has not yet been transferred to non-volatile storage 230 by device controller 210. In embodiments, data may be sent, or "flushed" from transfer buffers 211, over link 225, to non-volatile storage 230. In embodiments, in-flight data is flushed to non-volatile storage 230, even if the host has sent a fundamental reset command, as described above. Thus, notwithstanding that device controller 210 is a consumer-grade controller, and that SSD 201 may be an entry-level enterprise SSD, all in-flight data in transfer buffers 211 at the time of the host initiated reset may still be stored in non-volatile storage 230 prior to SSD 210 being actually reset.

As noted above, in a reset scenario, a conventional device controller would have the ability to flush data, but would not be able to properly respond to new host requests at the same time. Thus, as described above, in embodiments, device controller 210 is configured to extend the initialization period, which obviates such new host requests until after the reset initialization period ends. As described below, device controller 210 extends the initialization period by sending the second rest indication within a pre-defined time interval of the PCIe protocol.

Continuing with reference to FIG. 2, example device controller 210 also includes secondary CPU 215, which, in embodiments, may execute firmware that handles, inter alia, power-loss situations, in accordance with various embodiments. In alternate embodiments, however, device controller 210 may have only one CPU, or CPU core, that handles both normal operations and sudden power loss events. Or, for example, it may have alternate processing circuitry to handle reset commands of the host, including reset commands in connection with a power-loss situation.

In a device reset scenario, data from transfer buffers 211 must be committed to non-volatile storage 230 prior to device 201 resuming full functionality. In embodiments, transfer buffers 211 may be implemented in DRAM, SRAM, or any other form of volatile media, but are not presumed to be valid following a device reset. Because to write the transfer buffers to nonvolatile storage (e.g., NAND) takes more than the 100 µs following a reset in which a PCIe compliant device is required to be ready to initialize the link and begin operations vis-à-vis the host, as noted above, a consumer-grade reset sequence does not allow enough time to fully commit in-flight data. More time is needed. However, since the timing of the hardware reset varies from host to host, this cannot be accomplished by extending $T_{PERST}$ or not responding to PCIe events.

As noted above, there are other points in the reset sequence which can be leveraged to perform an internal reset of the device. As noted above, Error! Reference source not found. the host will perform a fixed series of steps following a successful fundamental reset in order to initialize device functionality. If SSD 201 resets itself during some of the later portions of this initialization sequence, the host will automatically go back to the beginning of the initialization sequence.

Thus, in accordance with various embodiments, an NVMe device, such as, for example, SSD 201, does not reset itself during the assertion and de-assertion of a PERST# signal by the host. Rather, in embodiments, SSD 201 resets only the PCIe link and address space, in an emulation of an actual reset, thus presenting to the host an illusion of an actual device reset, thereby delaying an actual fundamental reset. While in this state, the device cannot perform host I/O, but it may continue to flush existing data from transfer buffers 211.

Continuing with reference to FIG. 2, device controller 210 also includes registers 213, as shown. In embodiments, these registers may be a part of front-end ASIC hardware, for example. In embodiments, included in registers 213 are a CC.EN NVMe register, and a CSTS.RDY register. The role played by these registers is next described.

In embodiments, following the emulation of the actual fundamental reset by device controller 210, the host will proceed through the initialization sequence, writing to various PCIe and NVMe registers in the memory-mapped configuration space. As noted above, eventually, the host will try to enable device 201 by writing a "1" to the CC.EN NVMe register of registers 213. At this point the host is required to poll the device's CSTS.RDY register and wait for device controller 210 to change this value to 1, thereby indicating that the device is ready to accept commands from the host. In embodiments, during this polling period, the device may complete the internal flush of any in-flight data, and only once that data is fully stored in non-volatile storage 230, then perform an internal reset. The internal reset triggers a link reset which destroys the host PCIe state and forces a re-enumeration of the device. This latter internal reset is an actual or "hard" reset, as opposed to the earlier illusory reset. In response to the device performing the internal reset, the host will then start over at the beginning of the initialization sequence shown in FIG. 1, attaching a new NVMe driver instance in the process. By this means. the actual reset is delayed a sufficient time interval to complete the flushing of in-flight data form transfer buffers 211 to non-volatile storage 230, thereby implementing full PLP, even on a consumer grade controller, or on a consumer grade controller used as the basis for an entry-level enterprise SSD.

Figure 3:
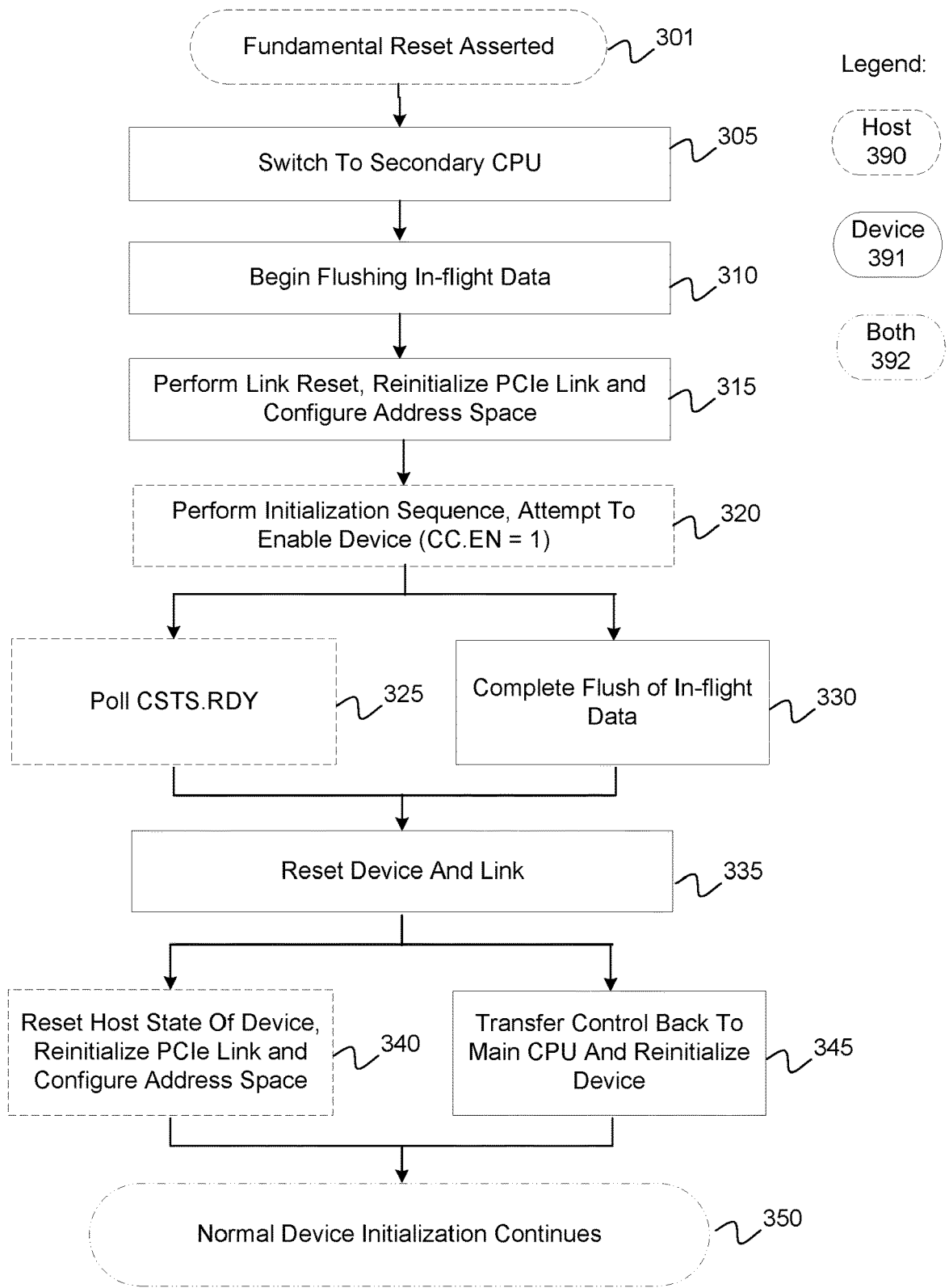
FIG. 3 depicts an embodiment of a method of delaying a fundamental reset, in accordance with embodiments disclosed herein.

FIG. 3 depicts a method 300 of delaying a fundamental reset of a SSD, in accordance with various embodiments. Method 300 is performed in part by an exemplary host 390, and in part by an exemplary SSD device 391, such as, for example, SSD 201 of FIG. 2, and one element of method 300 is performed by both the host 390 and the device 391. In embodiments, blocks of method 300 performed by device 391 may be, for example, be performed by device controller 210, as shown in FIG. 2, described above. As shown in the legend at the top right of FIG. 3, blocks of method 300 performed by host 390 are outlined in a dashed line outline, blocks of method 300 performed by device 391 are outlined in a solid line outline, and the block (350) performed by both 392 the host and the device are outlined with a "dot-dot-dash-dash" outline.

Beginning with block 301, performed by host 390, a fundamental reset is asserted. For example, as noted above, in a PCIe compliant link, this is done by host 390 asserting the PERST# sideband signal. In embodiments, the fundamental reset is asserted. For example, the fundamental reset may be due to an NVMe system reset, a power loss scenario, or, for example, other forms of PCIe reset. In response, at block 305, the device 391 switches to a secondary CPU, which is used to handle sudden power loss scenarios, and thus the remaining processing illustrated in blocks 310, 315, 330 and 335. In other embodiments, a device may not have a secondary CPU, and as a result, may not switch to a secondary CPU at this block, and may continue the processing of method 300 using its standard processing circuitry.

From block 305, method 300 proceeds to block 310, where device 391 begins flushing in-flight data from, for example, transfer buffers or other volatile storage, to non-volatile storage, thus securing the data prior to device 391 being reset.

From block 310, method 300 proceeds to block 315, where device 391 performs a link reset, reinitializes the PCIe link, and configures its address space. As described above, this is seen by host 390 as a standard reset, and the host then proceeds as if an actual reset is occurring. In reality, from the perspective of device 391, these steps are only an emulation of an actual reset, done to nominally respond to the host's PCIe reset command, but to "buy time" in which to flush in-flight data. Thus, as noted above, while in this state device 391 cannot perform I/O with the host, it can continue to move data out of temporary buffers.

From block 315, method 300 proceeds to block 320, where host 390 performs an initialization sequence, such as, for example, that illustrated in FIG. 1 and described above.

In addition, host 390 attempts to enable device 391 by, for example, setting the value of an enable register on the device to 1.

From block 320, method 300 bifurcates into two parallel paths, to blocks 325 and 330, one block performed by host 390, the other performed by device 391. At block 325, host 390, having set the enable register to 1 in block 320, now expects device 391 to respond by setting a "ready for commands" register to indicate that the device is ready to accept host commands. As described above, this register may be the CSTS.RDY register, and the host polls it for one or more polling intervals to see its value change, indicating device readiness for commands. For example, the register may be set to a value of 1 to so indicate. In embodiments, device 391 does not actually set this register until, at block 325, it completes the flushing of all in-flight data to non-volatile storage. In so doing, it leverages the polling interval of CSTS.RDY that is set by the host's operating system to complete the flushing of the in-flight data. IN most operating systems there is a polling interval for CSTS.RDY that repeats if the register is not set, and it continues to repeat for multiple polling intervals until a timeout period. For example, in the Linux operating system, the polling interval for CSTS.RDY is 100 ms (as per the function nvme_wait_ready( ) in the file drivers/nvme/host/core.c of the Linux kernel, version 4.19), and this polling interval is repeated until the timeout specified by CAP.TO. CAP.TO is specified in 500 ms units. Thus, in embodiments, CAP.TO is long enough to complete writing all in-flight data to non-volatile media even in worst-case conditions. If the link is reset by device 391 while in this polling loop, the NVMe driver instance (as illustrate din FIG. 1, at sub-task 117) will be deallocated by the host and re-enumeration will proceed.

From blocks 325 and 330, the two parallel processing paths rejoin, and method 300 proceeds to block 335, where device 391 rests itself and the link. This is a "hard" reset, as opposed to the earlier "illusory" or emulated reset of block 315.

From block 335, method 300 once again bifurcates into two parallel paths, to blocks 340 and 345, one block performed by host 390, the other performed by device 391. At block 340, due to the reset initiated at block 335 by device 391, host 390 resets its device state, reinitializes the link, and configures the address space once again. In parallel, at block 345, device 391 transfers control back to its primary, or main CPU (this is the inverse of block 305 above), as the actual reset is now going through, and the special event handled by device 391's secondary CPU, is now over. Obtaining control, the main CPU then proceeds to reinitialize the device.

From blocks 340 and 335, the two parallel processing paths rejoin, and method 300 proceeds to block 350, performed by both host 390 and device 391, where normal device initialization continues.

Thus, in one or more embodiments, apparatus may be provided, and methods may be implemented, that provide standard consumer-grade, or entry-level enterprise grade SSDs with the ability to, in response to a reset command received from a host, to move all in-flight data at the time the reset command is received to non-volatile storage. The reset command from the host may be ancillary to a sudden power-loss event, and thus, in one or more embodiments, full enterprise level SSD PLP is provided to the simpler and more economical consumer grade SSD controllers in the event of such a reset. The various apparatus and methods leverage aspects of a link protocol and communications standard, such as PCIe, to initially only emulate—but not actually perform—a conventional reset as seen by the host, giving the device sufficient time to complete flushing of in-flight data from temporary buffers of the SSD to non-volatile storage of the SSD. Then, once the in-flight data has been stored in non-volatile storage, the SSD performs an actual internal reset of the SSD. Thus, in one or more embodiments, the internal hard reset is delayed until a point in a host initialization sequence where a device-initiated reset causes the host to successfully re-initialize the SSD, and the delay leveraged to store in-flight data.

While the foregoing is directed to embodiments of the present disclosure, other and further embodiments of the disclosure may be devised without departing from the basic scope thereof, and the scope thereof is determined by the claims that follow.

What is claimed is:

1. A controller for a solid state drive (SSD), the controller comprising:
    an input interface configured to receive commands from a host over a link; and
    processing circuitry coupled to the input interface configured to:
        in response to receiving a reset command from the host:
            reset the link and an address space of the SSD;
            complete flush of in-flight data from temporary buffers to non-volatile storage of the SSD; and
            during an initialization sequence performed by the host, perform an internal reset.

2. The controller of claim 1, wherein the reset of the link and of the address space of the SSD is interpreted by the host as an indication of an actual reset being performed by the SSD.

3. The controller of claim 1, wherein the processing circuitry is further configured to:
    following the reset of the link and of the address space of the SSD, not perform input/output operations with the host.

4. The controller of claim 1, wherein both the link and the commands sent from the host over the link are compliant with the Peripheral Component Interconnect Express (PCIe) standard.

5. The controller of claim 4, wherein the processing circuitry is further configured to complete the flush of in-flight data from the temporary buffers within a pre-defined maximum number of polling intervals by the host of a register that indicates that the SSD is ready to accept host commands.

6. The controller of claim 5, wherein the register is a CSTS.RDY register, and wherein the polling interval is 100 microseconds and may be repeated a pre-defined number of times.

7. The controller of claim 4, wherein the reset command is a host-initiated PERST# signal.

8. The controller of claim 1, further comprising a primary central processing unit (CPU) and a secondary CPU, and wherein the processing circuitry is further configured, in response to receiving the reset command from the host, to switch from the primary CPU to the secondary CPU.

9. The controller of claim 1, wherein the processing circuitry is further configured to begin to flush the in-flight data to the non-volatile storage prior to resetting the link and the address space of the SSD.

10. The controller of claim 1, wherein in response to performing the internal reset, a host link reset is triggered that resets the host's state of the SSD, and causes the host to re-initialize the link and configure the address space of the SSD.

11. A data storage device (DSD), comprising:
    a non-volatile memory; and
    a controller configured to:
        provide a false reset indication to a host device in response to a reset command;
        flush in-flight data to the non-volatile memory; and
        provide a second reset indication to the host device.

12. The DSD of claim 11, wherein the false reset indication is interpreted by the host as an indication of an actual reset being performed by the DSD.

13. The DSD of claim 11, wherein the reset command is received over a link compliant with the Peripheral Component Interconnect Express (PCIe) standard, and wherein the reset command is a host-initiated PERST# signal.

14. The DSD of claim 11, further comprising a command readiness register, set by the controller and polled by the host for a predefined polling interval following the sending of a reset command, to indicate that the DSD is ready to receive commands from the host.

15. The DSD of claim 14, wherein the controller is further configured not to set the command readiness register until the controller completes the flushing of in-flight data to the non-volatile memory.

16. An apparatus, comprising:
    means for receiving a reset command from a host over a link;
    means for emulating a conventional reset of the apparatus as seen by the host in response to the command;
    temporary storage means;
    non-volatile storage means;
    means for flushing in-flight data from the temporary storage means to the nonvolatile storage means; and
    means for performing an actual reset prior to the host completing an initialization sequence of the apparatus.

17. The apparatus of claim 16, wherein the means for emulating a conventional reset further comprises means for resetting the link and an address space of the apparatus.

18. The apparatus of claim 17, wherein the means for flushing in-flight data further comprises means for beginning the flushing prior to emulating the conventional reset.

19. The apparatus of claim 16, wherein the means for flushing in-flight data further comprises means to complete the flushing of the in-flight data within a pre-defined time interval.

20. The apparatus of claim 16, wherein the apparatus is compliant with the NVMe communications standard, and wherein the reset command is a host-initiated PERST# signal.

* * * * *